(12) United States Patent
Buuck et al.

(10) Patent No.: US 9,148,190 B1
(45) Date of Patent: Sep. 29, 2015

(54) MULTIPURPOSE COILS

(75) Inventors: David C. Buuck, Prunedale, CA (US); Ilya D. Rosenberg, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 495 days.

(21) Appl. No.: 13/351,910

(22) Filed: Jan. 17, 2012

(51) Int. Cl.
  *H04B 1/38* (2015.01)
  *H04B 1/40* (2015.01)
  *H04B 5/00* (2006.01)
  *H04B 7/00* (2006.01)

(52) U.S. Cl.
  CPC ............... *H04B 1/38* (2013.01); *H04B 5/0031* (2013.01)

(58) Field of Classification Search
  CPC ............ H04B 5/0031; H04M 1/7253; H04M 2250/04; H04W 84/18
  USPC .......................................... 455/41.1, 41.2, 73
  See application file for complete search history.

(56) References Cited

U.S. PATENT DOCUMENTS

| | | | | |
|---|---|---|---|---|
| 8,125,453 B2* | 2/2012 | Shahoian et al. | ............. | 345/173 |
| 8,335,547 B2* | 12/2012 | Otterson | ....................... | 455/573 |
| 8,350,763 B2* | 1/2013 | Rappaport | ................... | 343/702 |
| 8,412,963 B2* | 4/2013 | Tsai et al. | ..................... | 713/300 |
| 8,423,122 B2* | 4/2013 | Steinberg et al. | ............. | 600/424 |
| 8,494,615 B2* | 7/2013 | Melamed et al. | ............. | 600/430 |
| 8,532,585 B2* | 9/2013 | Deleus et al. | ................ | 455/90.2 |
| 2010/0273469 A1* | 10/2010 | Seban et al. | ................... | 455/418 |

\* cited by examiner

*Primary Examiner* — Nay A Maung
*Assistant Examiner* — Maryam Soltanzadeh
(74) *Attorney, Agent, or Firm* — Lee & Hayes, PLLC

(57) ABSTRACT

In some implementations, an electronic device includes an actuator having a coil and a magnet, at least one of which may be movable relative to the other. The coil may receive a drive current to cause movement of at least one of the magnet or the coil, such as to provide a haptic output, motivate a loudspeaker, or the like. A transceiver electrically coupled with the coil through a connection circuit may use the coil as an antenna for at least one of sending or receiving a radio frequency communication through the coil. Additionally, or alternatively, the coil may be placed into proximity to a source of a magnetic field to induce an electric current in the coil. The induced electric current may be passed from the coil to a power management system, such as to charge a battery or the like.

22 Claims, 8 Drawing Sheets

MULTIPURPOSE COILS

BACKGROUND

People commonly use electronic devices for communicating with others, consuming digital media content, executing applications, and performing numerous other functions. Examples of such electronic devices may include eBook reader devices, cellular telephones and smart phones, tablet computers, portable media players, laptop and netbook computers, personal digital assistants, and navigation devices, to name a few. As these electronic devices continue to increase in popularity, providing ways to enhance the functionality of these devices within a limited form factor continues to be a priority.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Multipurposing Coils

Figure 1:
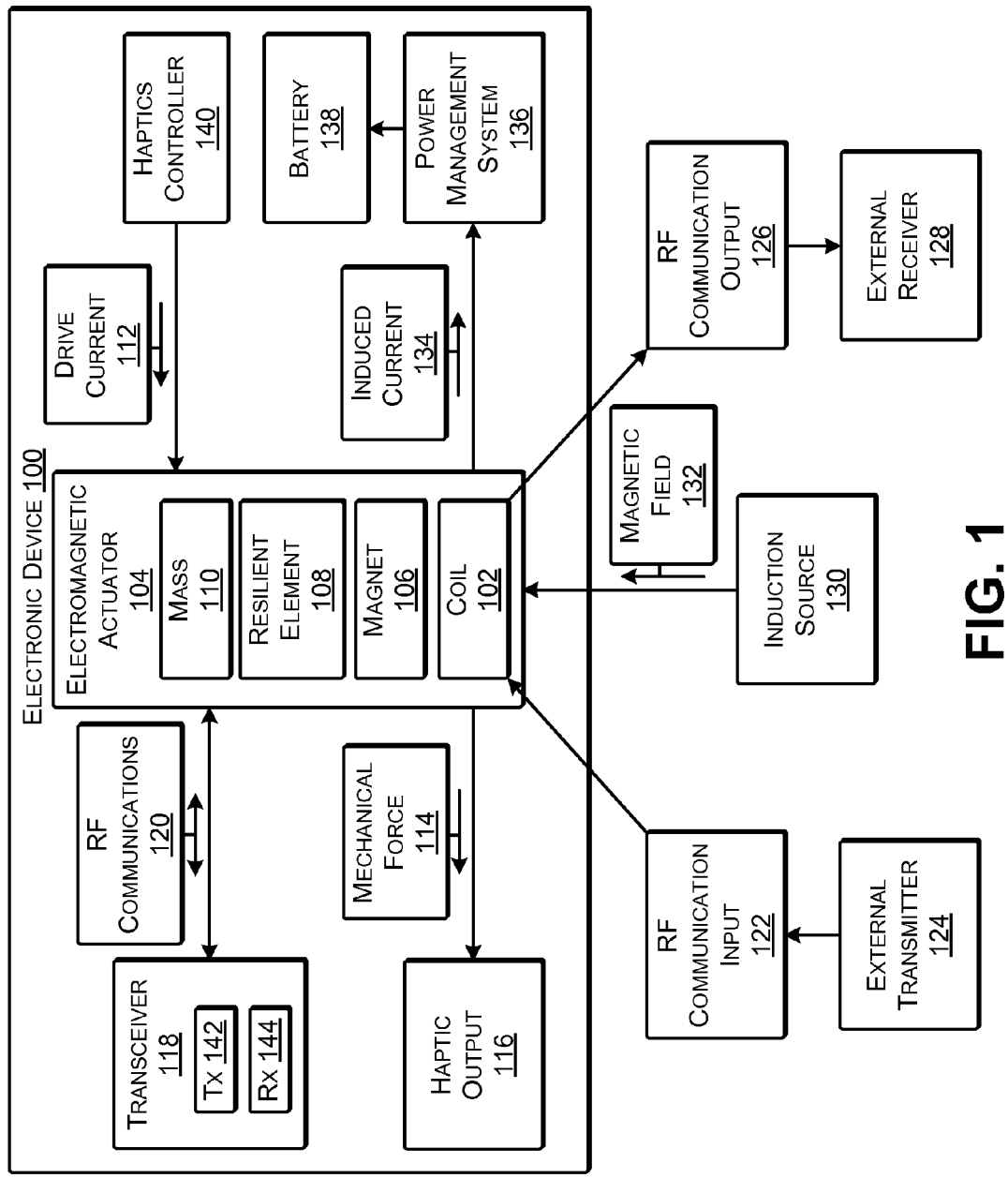
FIG. 1 illustrates an example device including a multipurpose actuator coil according to some implementations.

This disclosure includes techniques and arrangements for utilizing a coil on an electronic device for multiple purposes. For example, the electronic device may include an electromagnetic actuator having a coil for motivating the actuator to provide an output to a user of the device, such as a haptic and/or audio output. The coil of the electromagnetic actuator may be used for other purposes in addition to inducing movement in the electromagnetic actuator. In some implementations, the coil may be used as an antenna for receiving radio frequency (RF) communications and/or for transmitting RF communications. Additionally, or alternatively, the coil may be used as a magnetic field receptor for wireless inductive power transfer to the electronic device such as for charging a battery or other power storage device on the electronic device.

In some examples, the electromagnetic actuator may be a linear resonant actuator having a coil and a magnet suspended for relative movement by a spring or other resilient element. Accordingly, electric current may be passed through the coil to induce movement in the magnetic mass to generate a vibration in the electronic device that may be sensed by a user of electronic device such as for providing various tactile alerts, signals, notifications, or other haptic output to the user of the electronic device. In some examples, the electric current may be an oscillated or alternating current having a frequency based on a resonant of the actuator. Alternatively, the electromagnetic actuator may be a driver for a speaker, such as a woofer or subwoofer, included in the electronic device. Thus, the electromagnetic actuator may be used to provide mechanical output to the electronic device.

Additionally, in some examples, the coil of the electromagnetic actuator may be used to send and/or receive RF communications. As one example, with appropriate switching and/or impedance matching circuitry, the coil may be used as a near field communication (NFC) transceiver antenna. NFC is a set of standards for smartphones and similar electronic devices to establish radio communication with each other or other an NFC transceivers by bringing them into close proximity, such as several centimeters. Applications may include contactless transactions (e.g., commercial transactions), data exchange, and/or simplified setup of more complex communications such as Bluetooth® or WiFi. Furthermore, communication may also be possible between an NFC device and an unpowered NFC chip, such as an RFID (radio-frequency identification) tag. Additionally, in the case that a stylus is used with the electronic device 100, the NFC communications may be used to communicate with the stylus, such as for identifying different ends of the stylus, enabling the stylus to generate multiple colors, communicating unique stylus IDs, a load data rate, and so forth. NFC operates at 13.56 MHz on ISO/IEC 18000-3 air interface and at rates ranging from 106 kbit/s to 424 kbit/s. NFC uses magnetic induction between two loop antennas located within each other's near field, effectively forming an air-core transformer. Accordingly, in some implementations herein, the coil of the electromagnetic actuator may be employed as one of the loop antennas in an NFC communication pair. Furthermore, in the implementations herein, use of the coil as an antenna for RF transmissions is not limited to NFC transmissions, but may also be used for other types of RF transmissions, such as shortwave, citizens' band, amateur radio, Bluetooth®, WiFi, AM, FM, television broadcasts, cellular communications, and so forth.

In addition, in some implementations, the coil of the electromagnetic actuator may be used as a magnetic field receptor to receive electric power through induction from an induction energy source that provides a magnetic field. For example, the electronic device may be placed proximate to an induction power source, such as a charging pad, charging tablet, or other charging device that generates a varying magnetic field to induce an alternating current in the coil of the electromagnetic actuator. The alternating current produced in the coil may be rectified into direct current and provided to a power management system that uses the current to charge a battery, capacitor, or the like.

Furthermore, in some implementations, the coil is not associated with an actuator. For example, a coil may be shared as an antenna for sending and receiving RF communications, while also being used to wirelessly receive induced current for charging a battery, or the like. According to some examples, because the RF communications may be at a different frequency than the induced current, both functions may be performed simultaneously or contemporaneously using the coil.

In some examples, the multiple functions or purposes of the coil may be employed contemporaneously with one another. For instance, the multiple purposes of the coil may be utilized according to different frequencies of the electrical spectrum. Thus, suitable filters, isolation circuits, matching circuits, or the like, may be employed over a spread spectrum to ensure the correct delivery of various electrical signals to and from the coil. For example, the RF communications may be employed between 13 and 14 MHz, a drive current supplied to the coil for providing haptic output may be between 10 Hz and 1 kHz, and the induced current provided by the inductive charging may be between 10 kHz and 1 MHz.

As another example, control logic may be provided that establishes a priority among the multiple purposes of the coil. For example, a multiplexer may be operated to select a particular input or output to the coil for utilizing the coil for at least one of mechanical output, RF transmission, RF reception, or magnetic field wireless charging, such as contemporaneously or sequentially. Thus, based on a desired priority hierarchy, the control logic may operate the multiplexer to allow one or more of the multiple purposes to be performed using the coil at any one time.

Some example implementations are described in the environment of an electromagnetic actuator or transducer of an electronic device, such as a smart phone, a tablet computing device, a mobile computing device, a digital media device, and so forth. However, the implementations herein are not limited to the particular examples provided, and may be extended to other types of devices and actuators in other types of technologies, as will be apparent to those of skill in the art in light of the disclosure herein.

Example Electronic Device

FIG. 1 illustrates an example electronic device 100 that includes a multipurposed coil 102 according to some implementations herein. The electronic device 100 may be implemented as any number of electronic devices, such as an eBook reader, a tablet computing device, a cell phone or smart phone, a portable gaming device, a portable digital assistant, a laptop or netbook computer, a personal digital assistant, a navigation device, and so forth. Furthermore, the electronic device 100 may not necessarily be a mobile or portable device, and thus, in some implementations may include any of various other types of electronic devices capable of having electromagnetic actuators, transducers, or the like incorporated therein.

In this example, the electronic device 100 includes an electromagnetic transducer or actuator 104 that includes the coil 102 as an integral part of the electromagnetic actuator 104. The electromagnetic actuator 104 may further include a magnet 106 and a resilient element 108, such as a spring. For example, in a typical configuration, one of the coil 102 and the magnet 106 is movable relative to the other one of the coil 102 or the magnet 106, while the resilient element 108 allows oscillatory movement of the magnet 106 relative to the coil 102. Additionally, in some implementations, the magnet 106 and/or the coil 102 may have a movable mass 110 associated therewith. A natural resonant frequency of the actuator may be controlled based on a spring constant of the resilient member and a mass of the mass 110. Further, the coil 102 may include one or more loops of a wire or other conductor. The loops of the coil 102 may be of sufficient size, quantity, and position to generate a magnetic field capable of motivating the magnet 106 and the movable mass 110 upon passage of a drive current 112 through the conductive loops of the coil 102. The magnet 106 may be any suitable type of magnet or magnetizable material, such as a permanent magnet, a rare earth magnet, a ferromagnetic material, a magnetized substance, an electromagnet, and so forth.

The drive current 112 may be an alternating or oscillating current having a controlled waveform for producing a desired haptic output effect. As one example, the waveform of the drive current 112 may be controlled to match a natural resonant frequency of the electromagnetic actuator 104, typically between 10 Hz and 1 kHz, at which the electromagnetic actuator 104 operates most efficiently. Accordingly, movement of the magnet 106 and mass 110 relative to the coil 102 in an oscillatory manner due to passage of a drive current 112 through the coil 102 may cause a vibration or other mechanical force 114 resulting in a haptic output 116 from the electromagnetic actuator 104. For example, the mechanical force 114 may be applied to a housing or frame of the device 100 to provide the haptic output 116.

In addition, a transceiver 118 included on the electronic device 100 may employ the coil 102 as an antenna for transmitting or receiving radio frequency (RF) communications 120. For example, the coil 102 may receive an RF communication input 122 from an external transmitter 124 and/or may transmit an RF communication output 126 to an external receiver 128. As one example, the RF communications 120 may be NFC communications, as discussed above; however, implementations herein are not limited to NFC communications and may encompass other types of RF communications, as mentioned above. Further, in some examples, the external transmitter 124 and the external receiver 128 may together constitute an external transceiver.

Additionally, the device 100 may be placed into proximity to an induction energy source 130 that may generate a magnetic field 132 that induces an electric current to be output from the coil 102 as an induced current 134. For example, the magnetic field 132 may induce an alternating current that is output from the coil 102. The induced current 134 may be provided to a power management system 136 of the device 100. For instance, the power management system may rectify the induced current 134 into a direct current and apply the direct current to charge a battery 138, or other power storage device, such as a capacitor. In some examples, the induction source 130 may be a charging pad, a charging device, or other suitable source of a varying magnetic field to which the device 100 may be placed within close proximity.

The device 100 may further include a haptics controller 140 for generating the drive current 112. For example, the haptics controller 140 may generate any number of different types of drive currents such as waveforms of differing frequencies, amplitudes, etc., for producing various desired haptic effects or outputs using the electromagnetic actuator 104. The haptics controller 140 may generate the drive current 112 in response to various types of input, such as input from an application or an operating system executing on the electronic device 100, user input to a user interface or a control of the electronic device 100, and so forth.

Additionally, in some examples, the electronic device 100 includes the transceiver 118 that includes both a transmitter 142 and a receiver 144. However, in other examples, the electronic device may include just the transmitter 142 or just the receiver 144, depending on a type or intended use of the RF communications 120.

Figure 2:
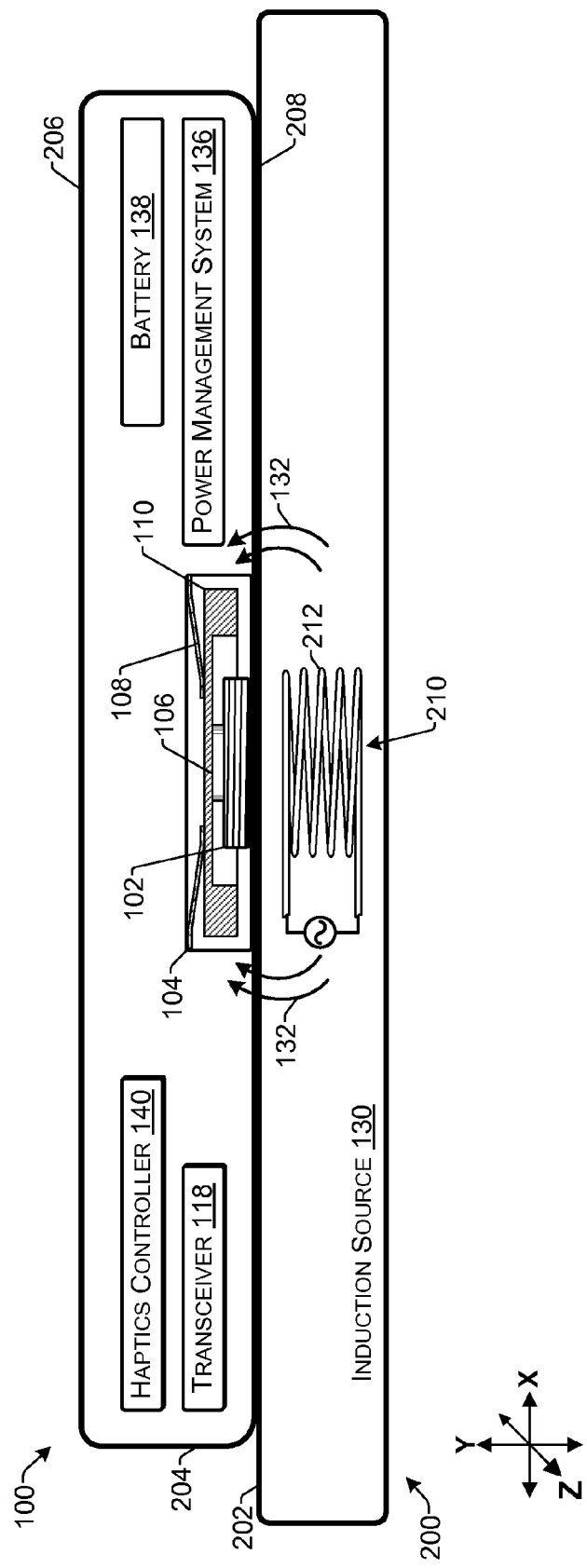
FIG. 2 is a cross-sectional view illustrating select components of the device and an induction energy source according to some implementations.

FIG. 2 depicts a cross-sectional view illustrating an example of employing a charging pad, a charging mat, or other charging device 200 for inducing an electric current in the coil 102 for carrying out inductive wireless charging of the battery 138 according to some implementations herein. In this example, the electronic device 100 may be placed on a surface 202 of the charging device 200, or may be located otherwise proximate to the charging device 200, to allow the charging device 200 to serve as the induction source 130 discussed above.

In the example of FIG. 2, the electronic device 100 and the charging device are illustrated in cross section showing one example of the actuator 104 and several select components as included blocks. The electronic device 100 includes a housing 204 having a first surface 206 and a second surface 208. In this example, the second surface 208 is placed on the surface 202 of the charging device 200, thus bringing the coil 102 into proximity to the charging device 200. The example of the electromagnetic actuator 104 is illustrated in cross section in FIG. 2 within the housing 204 of the electronic device 100. In this example, the electromagnetic actuator 104 is illustrated as a y-axis linear actuator that may oscillate in the y-axis direction, i.e. toward and away from the first surface 206 and the second surface 208 of the device 100. For example, the mass 110 is connected to the magnet 106 and suspended by a spring or other resilient element 108 to enable oscillation of the mass 110 and the magnet 106 in the y-axis direction. In other examples, the electromagnetic actuator 104 may be an x-axis (or z-axis) linear actuator or other suitable electromagnetic actuator having a coil 102. For instance, an x-axis actuator may oscillate generally parallel to the first and second surfaces 206 and 208. Other variations will also be apparent to those of skill in the art having the benefit of this disclosure, and thus, implementations herein are not limited to any particular type of electromagnetic actuator. Further, references to an x-y-z coordinate system are provided for convenience of discussion and should not be used to limit the disclosure herein in any fashion.

To function as an actuator, the electromagnetic actuator 104 may be activated by a drive current received from the haptics controller 140. For instance, the drive current may be varied or oscillated, as mentioned above, which in turn varies a magnetic field generated by the coil 102, causing the magnet 106 and the mass 110 to move up and down relative to the coil 102. The resilient element 108 suspends the magnet 106 and the mass 110. The resilient element 108 allows the magnet 106 and the mass 110 to move up and down relative to the coil 102, while otherwise maintaining the positioning of the magnet 106 and the mass 110 relative to the coil 102.

The charging device 200 may include a charging coil 210 having one or more conductive loops 212. An electric current from an external source (not shown in FIG. 2) may be passed through the charging coil 210 to generate the magnetic field 132 in proximity to the coil 102 of the actuator 104. As mentioned above, the electric current induced in the coil 102 may be provided to the power management system 136, such as for storage in the battery 138 or other power storage device. For example, the power management system 136 may rectify the induced current provided by the coil 102 into direct current and may apply the direct current to charge the battery 138. Furthermore, a frequency of the current passing through the charging coil 210 may be controlled to control, at least in part, a frequency of the induced current generated in the coil 102. Furthermore, in some examples, the charging coil and/or the coil 102 may be tuned to one another, such as to a particular frequency. For instance, the efficiency of the induction can be substantially enhanced by proper tuning of the coils 102, 212, and by having the charging coil 112 in proximity (e.g., typically within several centimeters) to the coil 102. Numerous other variations will be apparent to those of skill in the art in view of the disclosure herein.

Figure 3:
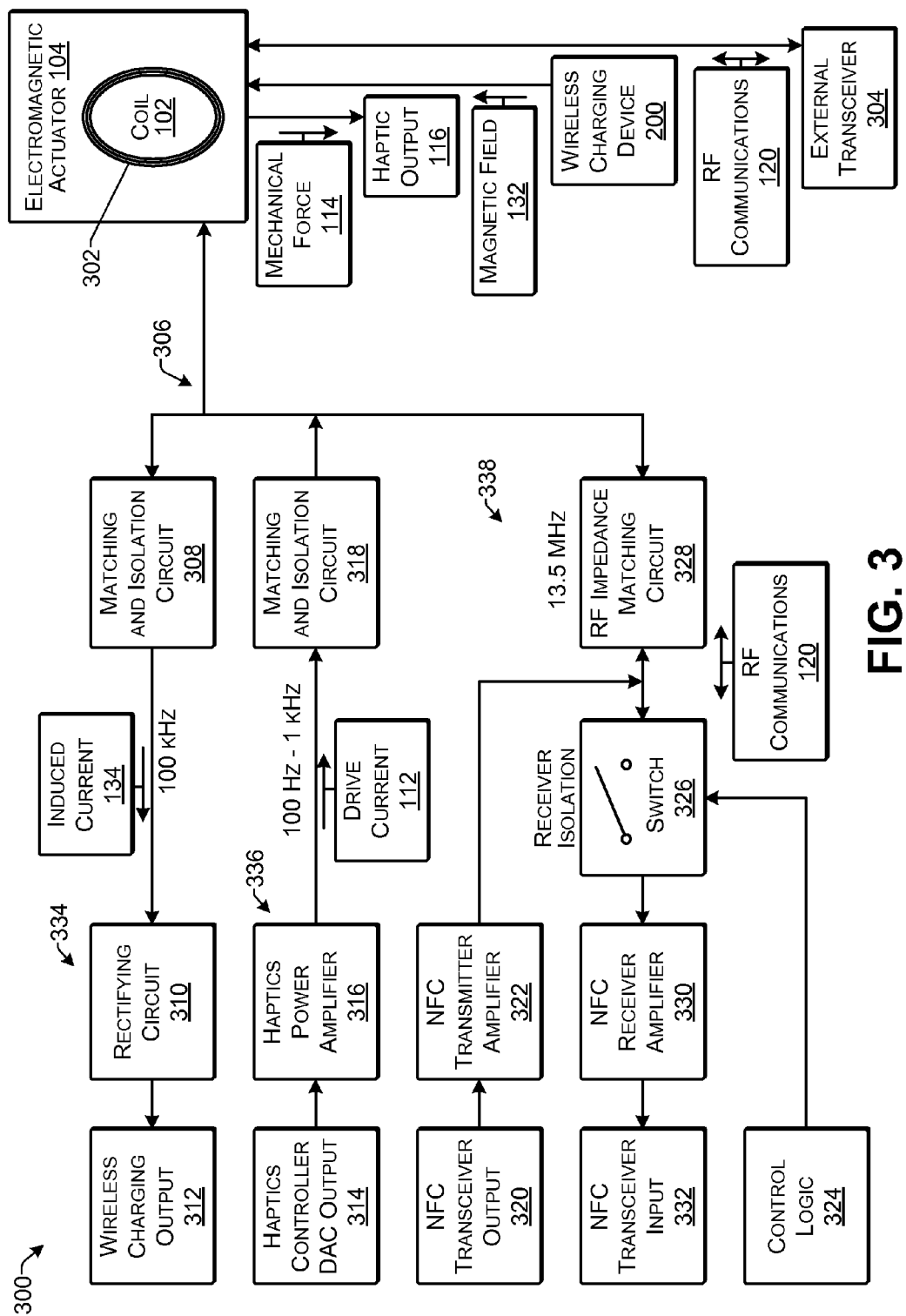
FIG. 3 illustrates an example framework for a multipurpose coil operated on different frequencies according to some implementations.

FIG. 3 illustrates an example framework 300 to enable contemporaneous multipurpose use of the coil 102 according to some implementations herein. In this example, the coil 102, having one or more loops 302 of a conductor, such as a wire, may serve as an actuator coil of the electromagnetic actuator 104. The electromagnetic actuator 104 may be activated by the drive current 112, as described above, to provide mechanical force 114 as haptic output 116. Additionally, the coil 102 may be utilized for wireless charging, such as for charging the battery 138 or other power storage device of the device 100. For example, the coil 102 may produce induced current 134 under the inducement of a magnetic field 132 from a wireless charging device 200 in proximity to the coil 102. Further, the coil 102 may serve as an RF antenna to transmit or receive RF communications 120 or other RF signals, such as during communication with an external transceiver 304.

In the example of FIG. 3, a spread spectrum arrangement may be employed to enable contemporaneous use of the coil 102 for multiple different purposes as described above. In other words, the multiple purposes for which the coil 102 is utilized may be performed using different electrical frequencies (e.g., an order of magnitude different in some examples) to avoid interference with one another. For example, the wireless charging may take place using energy operating at substantially different frequencies from the haptics drive current and the RF communications. With respect to the wireless charging, the magnetic field 132 from the wireless charging device 200 may be controlled to generate the induced current 134 in a range of 10 kHz to 1 MHz, such as around 100 kHz. On the other hand, the drive current 112 for driving the electromagnetic actuator 104, as mentioned above, may be operated near the resonant frequency of the actuator or multiples thereof, such as in the range of 10 Hz to 1 kHz.

Furthermore, the RF communications 120 may be operated according to particular communication protocols such as NFC, or other RF communication frequencies such as in the range of 30 kHz to 30 GHz. In some examples, to avoid interference with the wireless charging, the RF communications 120 may be operated at frequencies greater than the frequency of the wireless charging, such as greater than 100 kHz, or greater than 1 MHz, and so forth, depending on the frequency of the energy generated by the wireless charging. Likewise, the frequency of the energy generated by the wireless charging may be controlled to avoid interference with a particular RF communication frequency desired to be used with the coil 102.

When the device 100 is placed within proximity of a wireless charging device 200, induced current 134 is generated in the coil 102. The induced current 134 may pass from the coil 102 to a connection circuit 306. The induced current 134 may be received through the connection circuit 306 by a matching and isolation circuit 308. For example, the matching and isolation circuit 308 may be configured to receive the induced current 134 based on a frequency range of the induced current 134, while denying passage of other electromagnetic energy outside the particular frequency range. For example, the matching and isolation circuit 308 may include appropriate filters or the like. The induced current 134 may then pass to a rectifying circuit 310, such as a diode bridge, that may transform the induced current 134 from an alternating current to a direct current. The rectified induced current 134 may pass to a wireless charging output 312, and then to a capacitor, or the like, for interim storage, or directly to the battery 138 and/or other power storage device. Thus, the rectifying circuit 310 and the wireless charging output 312 may be included in the power management system 136 mentioned above.

The framework 300 may further include a haptics controller digital-to-analog converter (DAC) output 314 that passes a drive current 112 generated by the haptics controller 140 (not shown in FIG. 3) to a haptics power amplifier 316. For example, the haptics controller 140 may generate a signal to be delivered to the electromagnetic actuator 104 to produce a desired haptic effect on the device 100. The signal from the haptics controller 140 is converted from digital to analog by the haptics controller DAC output 314, and then may be amplified by the haptics power amplifier 316 to produce the drive current 112. The drive current 112 may pass through a matching and isolation circuit 318 to the coil 102 of the electromagnetic actuator 104. For example, the matching and isolation circuit 318 may prevent other electrical energy such as the RF communications 120 or the induced current 134 from feeding to the haptics power amplifier 316. Further, in other implementations, the matching and isolation circuit 318 may be eliminated. The drive current 112 passes to the coil 102 through the connection circuit 306. Introduction of the drive current 112 to the coil 102 causes oscillation of the actuator 104 as the mechanical force 114, resulting in the haptic output 116.

The framework 300 may further include transceiver capabilities for sending and/or receiving RF communications 120, such as to and/or from the external transceiver 304. For example, the external transceiver 304 may be included in another electronic device, an RFID tag, or the like. The illustrated example is described in terms of NFC as one example of a suitable communication protocol and frequency, although numerous other RF communication frequencies and protocols may be used. Thus, implementations herein are not limited to NFC as the RF communications 120.

In the illustrated example, an NFC transceiver output 320 is provided to an NFC transmitter amplifier 322, such as a low-noise amplifier, which amplifies the output as an RF communication 120 to be transmitted to the external transceiver 304. When an RF communication 120 is to be transmitted, control logic 324 may activate a receiver isolation switch 326 to ensure that the RF communication 120 that is to be transmitted is not fed back to the receiving portion of the transceiver on the electronic device 100. The RF communication 120 to be transmitted passes through an RF impedance matching circuit 328 and through the connection circuit 306 to the coil 102. The coil 102 may serve as an antenna for transmitting the RF communication 120 to the external transceiver 304.

A received RF communication 120 may travel a reverse path from the coil 102, which acts as an antenna for receiving the received RF communication 120. The received RF communication 120 passes through the connection circuit 306 to the RF impedance matching circuit 328. For example, the RF impedance matching circuit 328 may include a suitable high pass filter, or the like, to allow passage of the received RF communication 120 while preventing passage of other electrical signals, such as the induced current 134 or the drive current 112. The receiver isolation switch 326 may be placed in a closed position by the control logic 324 when the transceiver is not sending a transmission, and thus the received RF communication 120 may be passed through the switch 326 to an NFC receiver amplifier 330, such as an RF power amplifier, which amplifies the received RF communication 120 and passes the RF communication 120 to an NFC transceiver input 332 from which the RF communication 120 may pass through further processing in accordance with the type or purpose of the received RF communication 120.

Accordingly, the framework 300 may include three portions that utilize the coil 102 for three different purposes, e.g., a wireless charging portion 334, a haptics portion 336 and a RF communication portion 338, each of which may operate at a different frequency to enable simultaneous or contemporaneous use of the coil 102 for multiple purposes. In some instances, the coil 102 may be optimized in size, number of windings or the like, to optimize or balance the efficiency of the multiple different functions described above. Furthermore while three different purposes are described in this example, in other examples, any two of the three may be applied, or other purposes may also be applied to the coil 102.

Figure 4:
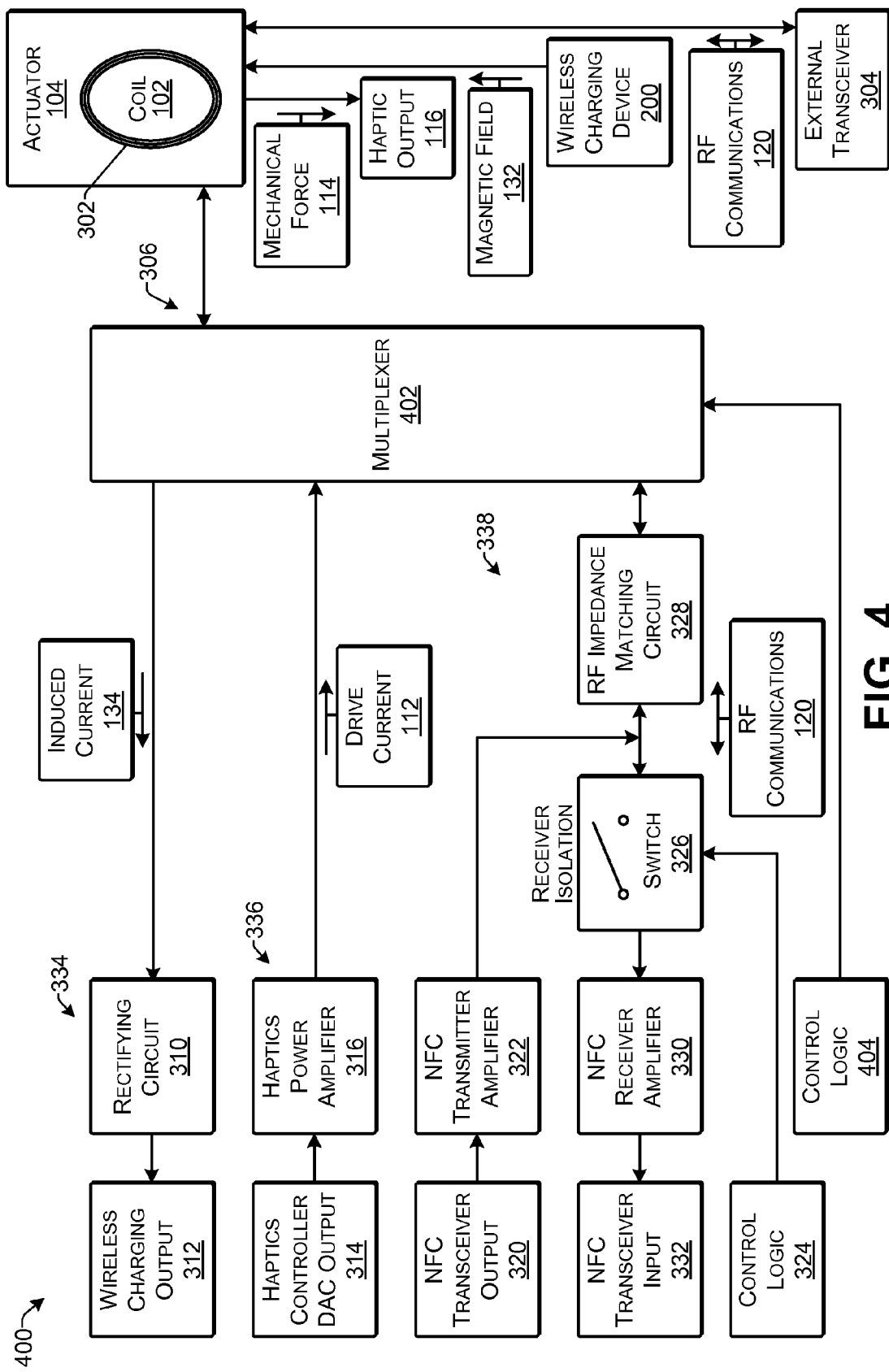
FIG. 4 illustrates an example framework for a multipurpose coil operated with a multiplexer according to some implementations.

FIG. 4 illustrates an example framework 400 to enable multipurpose use of the coil 102 on a split time basis according to some implementations herein. In the example of FIG. 4, a multiplexer 402 is included in the connection circuit 306 and may be controlled according to control logic 324. For example, the multiplexer 402 may included a plurality of switches to control passage of electrical signals (e.g., the drive current 112, the RF communications 120, or the induced current 134) to or from the coil 102 to an appropriate location. For example, the multiplexer 402 may be an analog multiplexer that allows passage of one or more signals to or from one or more different portions based on control logic 404. In one implementation, the multiplexer 402 may include three switches have one side ganged together to form a single pull, triple throw switch which may be controlled by the control logic 404 to allow passage of a particular electrical signal.

The control logic 404 may prioritize certain electrical signals over other signals when those signals would interfere with one another. For example, when both an RF communication 120 that is to be transmitted and a haptics output (i.e., drive current 112) are sent to the coil 102 there may be a possibility of one signal interfering with a function of the other signal. Consequently, the control logic 404, based at least in part upon a priority hierarchy, may control the multiplexer 402 to block one of the signals 112, 120, while allowing passage of the other one of the signals 112, 120. The control logic 404 may then cause reissuance of the blocked signal 112, 120. For instance, in some cases the haptic output may have a higher priority than the RF communication, while in other cases the RF communication may have a higher priority than the haptic output. The induced current 134 may typically have the lowest priority since the induced current 134 is provided over a long period of time, such as when the device is otherwise dormant, and does not include information that may be time sensitive or user driven. Accordingly, the multiplexer 402 may be controlled by the control logic 404 to route electrical signals to and from the coil 102 to ensure a desired level of performance for each purpose to which the coil 102 is applied.

Figure 5:
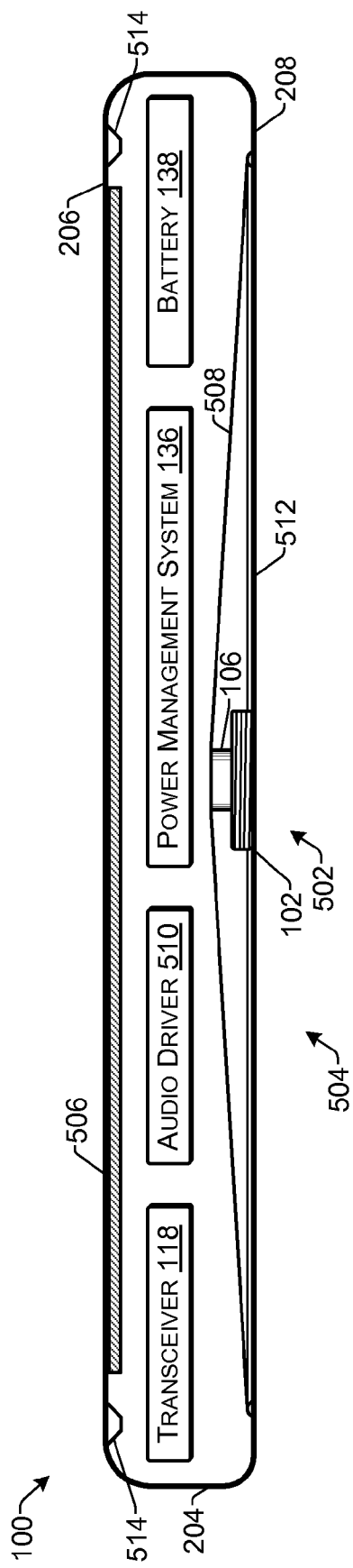
FIG. 5 is a cross-sectional view illustrating select components of the device including a speaker having a multipurpose coil according to some implementations.

FIG. 5 illustrates a cross-sectional view of another example of the device 100 that includes the coil 102 as part of an electromagnetic actuator 502 of a speaker 504, such as a woofer or subwoofer. The electromagnetic actuator 502 may operate in a similar manner to that described above for the electromagnetic actuator 104. In the configuration of FIG. 5, the coil 102 is fixed to the second wall 208. For example, the speaker 504 may be located on a side of the electronic device 100 opposite to a display 506 of the electronic device 100. Furthermore, a resilient cone 508 of the speaker 504 may serve as the resilient element 108 and also as the mass 110. The magnet 106 may be connected to the cone 508 and may move under influence of a magnetic field generated by the coil 102 to cause movement of the cone 508 to generate an audio output or other mechanical output. Alternatively, as another example, the positions of the coil 102 and the magnet 106 may be reversed, with the coil 102 being connected to the cone 508 and the magnet 106 being fixed to the second wall 208.

The speaker 504 may operate in a conventional manner by receiving an audio signal initially provided by an application, operating system, or the like (not shown in FIG. 5), and delivered through an audio driver 508. For example, the audio driver 508 may issue the drive current 112, which may be amplified by an amplifier similar to the haptics power amplifier 316 and delivered to the coil 102 through the connection circuit 306. Thus, the drive current 112 may oscillate the coil 102 and the speaker cone 508 towards and away from the second wall 208 based on the audio signal. Furthermore, one or more openings (not shown in FIG. 5) may be included through the first wall 206 or the sidewalls of the electronic device 100 to permit passage of air during oscillation of the speaker cone 508, and the second wall 208 of the device 100 may include a grill 512 or other air permeable configuration. Furthermore, the device 100 may include additional speakers 514, such as tweeters or midrange speakers.

Figure 6:
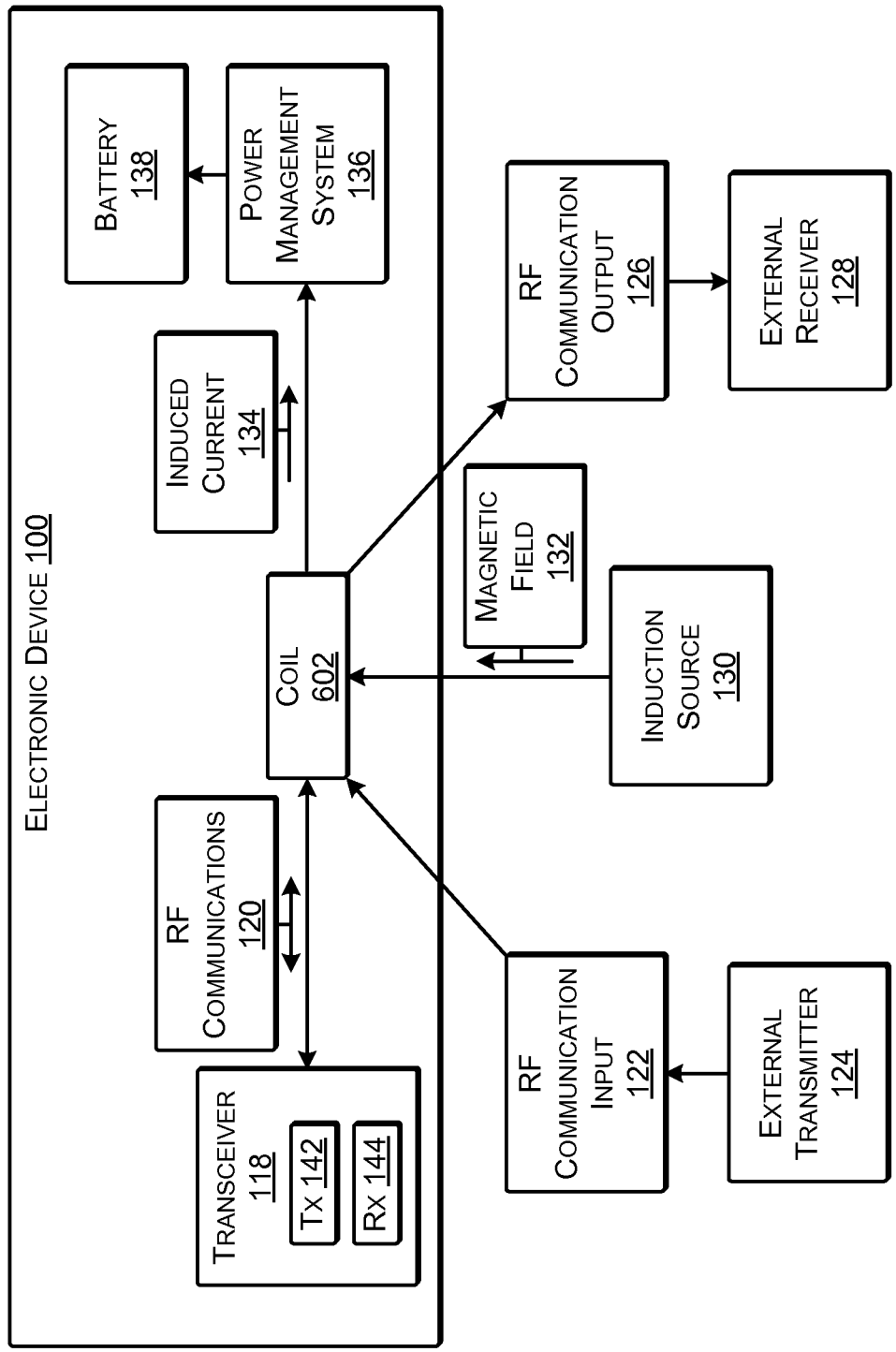
FIG. 6 an example device including a multipurpose coil according to some implementations.

In addition, the coil 102 may also be used for the other purposes discussed above i.e., at least one of wireless power reception or as an antenna for transmitting and receiving RF communications. For example, the device 100 may be placed in proximity to a charging device 200 to induce a current in the coil 102, such as for charging a battery 138 or other power source or power storage device of the device 100. Additionally, the coil 102 may be connected to a transceiver 118 included in the device 100, as described above, and the coil 102 may serve as an antenna for sending and/or receiving RF communications, including NFC. Accordingly, the device 100 of FIG. 5 may be configured to operate the coil 102 for multiple purposes according to either of the frameworks 300 or 400 discussed above with respect to FIG. 3 or 4, respectively. For example, the haptics controller output 314 may be replaced by an audio driver output, and the haptics power amplifier 316 may be replaced by an audio amplifier to generate the drive current 112. Numerous other variations will be apparent to those of skill in the art in view of the disclosure's herein FIG. 6 illustrates another example of the electronic device 100 according to some implementations herein. In the example, of FIG. 6, a coil 602 is provided that is not associated with an electromagnetic actuator. For example, the coil 602 may include at least one conductor loop, and may be used to receive electromagnetic energy as induced current 134 for use in wireless charging from the magnetic field 132. Further, the coil 602 may also be used as an antenna to send and/or receive RF communications 120, as described above. The coil 602 may be used to perform these functions contemporaneously, such as based on the frameworks 300 or 400 described above with respect to FIGS. 3 and 4, respectively. For example, the haptics portion 336 may be eliminated from the frameworks 300 and 400, but otherwise the frameworks 300, 400 may function in the manner described above, with the coil 602 substituted for the coil 102 and the actuator 104. For example, the coil 602 may be shared for wireless charging and RF transmission/reception, such as through use of different frequencies for the two different functions, as described with respect to FIG. 3, or through time slicing of the two different functions with a multiplexer 402 and control logic 404, as described with respect to FIG. 4. Furthermore, in the example of FIG. 6, the coil 602 may be optimized or balanced to improve the efficiency of both the wireless charging the RF communications, without concern for the operation of an electromagnetic actuator. Other variations will also be apparent to those of skill in the art in view of the disclosure herein.

Example Process

Figure 7:
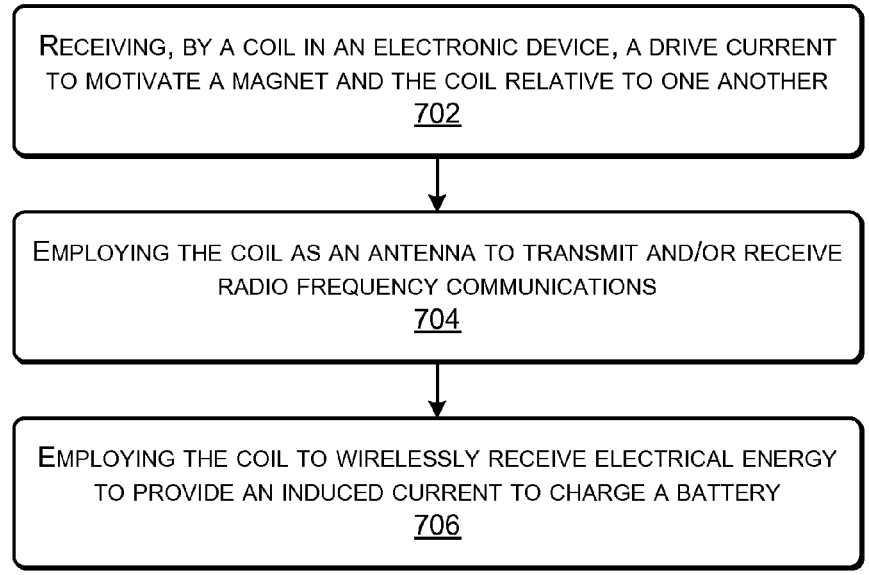
FIG. 7 is a flow diagram illustrating an example process for a multipurpose coil according to some implementations.

FIG. 7 illustrates an example process for implementing the techniques described above. This process is illustrated as a collection of operations in logical flow diagrams, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the process is described with reference to the devices and frameworks described in the examples herein, although the process may be implemented in a wide variety of other devices or frameworks.

FIG. 7 is a flow diagram illustrating an example process 700 that may be executed on the device 100 according to some implementations.

At 702, a coil included in the electronic device receives a drive current to cause movement of at least one of a magnet and the coil relative to the other one of the coil and the magnet. For example, the coil may be included in an electromagnetic actuator for providing haptic outputs, and the drive current may cause the magnet and an associated mass to oscillate relative to the coil to produce a desired haptic effect. As another example, the coil may be included in a speaker and the drive current may cause the speaker to generate sound. Thus, the coil may be fixed and the magnet may be caused to moved relative to the fixed coil. Alternatively, the magnet may be fixed and the coil may be caused to moved relative to the fixed magnet. Other variations will also be apparent in light of the disclosure herein. For example, the magnet and the coil may both move relative to one another.

At 704, the coil is also employed as an antenna to transmit and/or receive RF communications. For example, a transceiver may be able to communicate with the coil to use the coil as an antenna for sending or receiving RF communications.

At 706, additionally or alternatively, the coil is employed to wirelessly receive electrical energy to provide an induced current to charge a battery of the device, or the like. For example, a varying magnetic field may be placed in proximity to the coil to induce a current in the coil that can be passed to a power management system for use in charging a battery or other power storage device.

The example process described herein is only an example process provided for discussion purposes. Numerous other variations will be apparent to those of skill in the art in light of the disclosure herein. Further, while the disclosure herein sets forth several examples of suitable frameworks, architectures and devices for executing the process, implementations herein are not limited to the particular examples shown and discussed.

Example Device

Figure 8:
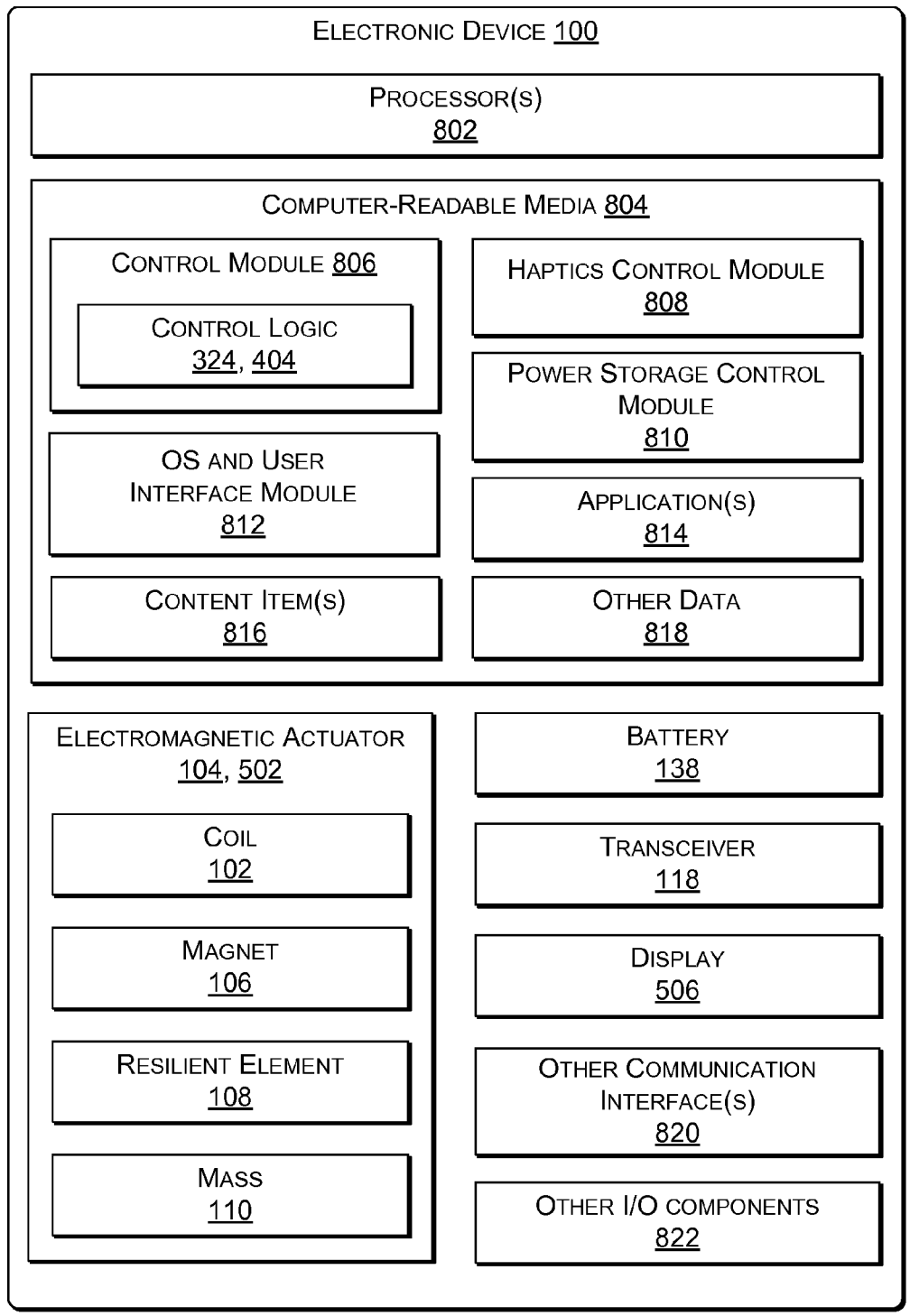
FIG. 8 illustrates select components of an example electronic device according to some implementations.

FIG. 8 illustrates select example components of the electronic device 100 that may be used to implement the functionality described above according to some implementations. In a very basic configuration, the electronic device 100 includes or accesses components, such as at least one processor 802 and a computer-readable media 804. Each processor 802 may itself comprise one or more processors or processing cores.

Depending on the configuration of the electronic device 100, the computer-readable media 804 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium which can be used to store information and which can be accessed by the processor 802 directly or through another computing device. Accordingly, the computer-readable media 804 may be able to maintain instructions, modules or components executable by the processor 802.

The computer-readable media 804 may be used to store any number of functional components that are executable by the processor 802. In some implementations, these functional components comprise instructions, code or programs that are executable by the processor 802 and that, when executed, implement operational logic for performing the actions attributed above to the device 100. Functional components maintained in the computer-readable media 804 may include a control module 806 that may include the control logic 324, 404, as described above. In other implementations, however, the control logic 324 and/or 404 may be a logic circuit, microcode, a logic unit, or the like. The control module 806 may further include executable instructions for controlling the transceiver 118, such as for signal processing, signal generations, and the like.

Additional functional components stored in the computer-readable media 804 may include a haptics control module 808, which, in some examples, may encompass the haptics controller 140 described above to generate signals as haptic outputs based on inputs from an operating system, a user interface, or an application executing on the processor 802. The computer-readable media 804 may further include a power storage control module 810 for receiving the induced current 134 and managing charging of the battery 138 or other power storage device included in the power management system 136.

Other functional components may include an operating system and user interface module 812 for controlling and managing various functions of the device 100. Depending on the type of the device 100, the computer-readable media 804 may also optionally include one or more applications 814, one or more content items 816, and other data 818, which may include data used by the application(s) 814 and/or the operating system 812. The device 100 may further include many other logical, programmatic and physical components, of which those described above are merely examples that are related to the discussion herein. In a particular non-limiting implementation, the device 100 may embody an eBook reader and the one or more content items 816 may include eBooks, audio books, songs, videos, still images, and the like.

In some examples, the device 100 may include the display 506, which may be passive, emissive or any other form of display. In one implementation, the display 506 uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 506 may be an active display such as a liquid crystal display, plasma display, light emitting diode display, organic light emitting diode display, and so forth.

The device 100 may further include one or more other communication interfaces 820 in addition to the transceiver 118. For example, the other communication interfaces 820 may support both wired and wireless connection to various networks, such as cellular networks, radio, WiFi networks, short-range or near-field networks (e.g., Bluetooth®, NFC), infrared signals, local area networks, wide area networks, the Internet, and so forth.

The electronic device 100 may further be equipped with various other input/output (I/O) components 822. Such I/O components may include various controls (e.g., buttons, a joystick, a keyboard, etc.), speakers (e.g., the speakers 504, 514), a microphone, a camera, connection ports, and so forth. For example, the operating system 812 of the electronic device 100 may include suitable drivers configured to accept input from a keypad, keyboard, or other controls and devices included as the other I/O components 822. For instance, the controls may include page turning buttons, navigational keys, a power on/off button, selection keys, and so on. Additionally, the electronic device 100 may include various other components that are not shown, examples of which include removable storage, a global positioning system (GPS) device, a PC Card component, and so forth.

Various instructions, methods and techniques described herein may be considered in the general context of computer-executable instructions, such as program modules stored on computer storage media, such as computer-readable media 804, and executed by the processor(s) 802. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:
1. A device comprising:
a haptics controller to generate a drive current;
an actuator, the actuator including a coil and a magnet, one of the coil and the magnet being movable relative to the other one of the coil and the magnet, the coil including one or more loops of a conductor to receive the drive current to oscillate the one of the magnet and the coil relative to the other one to provide a haptic output;

a connection circuit to conduct the drive current generated by the haptics controller to the coil;

a transceiver electrically coupled with the coil through the connection circuit, the coil serving as an antenna for the transceiver to at least one of send or receive a radio frequency (RF) communication through the coil; and wherein the drive current and the RF communication operate at different frequencies to enable concurrent operation of the actuator and the transceiver.

2. The device as recited in claim 1, further comprising a battery to be charged with energy from an electric current induced in the coil when the coil is in proximity to a source that provides a magnetic field to induce the electric current in the coil.

3. The device as recited in claim 2, further comprising an RF impedance matching circuit to allow passage of the RF communication between the coil and the transceiver, while impeding passage of the drive current or the induced electric current to the transceiver.

4. The device as recited in claim 1, further comprising a multiplexer to selectively allow passage of at least one of the RF communication, the drive current or the induced electric current to or from the coil, respectively.

5. A method comprising:
receiving, by a coil in an electronic device, a drive current to cause movement of at least one of a magnet or the coil;
concurrently with the receiving the drive current, employing the coil for at least one of:
sending or receiving, as an antenna, a radio frequency (RF) communication, or
receiving an induced current to charge a battery included in the electronic device; and
the method further comprising blocking, using a multiplexer, passage of at least one of the drive current or the RF communication.

6. The method as recited in claim 5, further comprising employing the coil for both:
sending or receiving, as an antenna, the RF communication; and
providing the induced current to charge the battery included in the electronic device.

7. The method as recited in claim 5, wherein:
the receiving the drive current comprises receiving the drive current at a first frequency; and
the employing the coil comprises employing the coil at a second frequency for the at least one of:
sending or receiving the radio frequency communication; or
receiving the induced current to charge the battery.

8. The method as recited in claim 5, wherein the coil is integral to an actuator, the actuator including a resilient member to support one of the coil or the magnet for movement relative to the other one of the coil or the magnet, the receiving the drive current causing movement of the coil or the magnet to provide a haptic output for the electronic device.

9. The method as recited in claim 5, wherein the coil is integral to a speaker, the speaker including a speaker cone, the drive current causing movement of at least one of the coil or the magnet to cause oscillation of the speaker cone to provide an audio output.

10. A device comprising:
a coil including at least one conductor loop;

a magnet, one of the coil and the magnet movable relative to the other of the coil and the magnet in response to passage of a drive current through the coil; and a battery to receive an induced current from the coil to charge the battery as a result of the coil being placed proximate to a magnetic field generated external to the device; and a circuit to impede the drive current from being passed to the battery.

11. The device as recited in claim 10, further comprising a rectifying circuit to rectify the induced current into a direct current to charge the battery.

12. The device as recited in claim 10, further comprising a transmitter to provide a radio frequency (RF) communication to the coil, the coil serving as an antenna to transmit the RF communication.

13. The device as recited in claim 10, further comprising a receiver to receive a radio frequency (RF) communication received by the coil, the coil serving as an antenna to receive the RF communication.

14. The device as recited in claim 10, further comprising:
a transceiver, the coil serving as an antenna for the transceiver for radio frequency (RF) communications; and
an RF impedance matching circuit to impede at least one of the drive current or the induced current from being passed to the transceiver.

15. A device comprising:
a coil including at least one conductor loop;
a transceiver, the coil serving as an antenna for the transceiver for a radio frequency (RF) communication; and
a battery to receive an induced current from the coil to charge the battery as a result of the coil being placed proximate to a magnetic field generated external to the device; and
a circuit to impede the induced current from being passed to the transceiver while permitting passage of the RF communication.

16. The device as recited in claim 15, further comprising a magnet, one of the coil and the magnet being movable relative to the other one of the coil and the magnet in response to passage of a drive current through the coil.

17. The device as recited in claim 16, wherein the magnet is included in an actuator that produces a haptic output as a result of the drive current passing through the coil.

18. The device as recited in claim 16, wherein the magnet is included in a speaker that produces an audio output as a result of the drive current passing through the coil.

19. The device as recited in claim 15, wherein the RF communication and the induced current are at different frequencies to enable sharing of the coil for contemporaneous charging of the battery and communication of the RF communication.

20. The device as recited in claim 10, further comprising:
a near field communications (NFC) transceiver, the coil serving as an antenna for the transceiver for NFC communications; and
a circuit to impede at least one of the drive current or the induced current from being passed to the transceiver.

21. The device as recited in claim 10, wherein the coil is a loop antenna in an NFC communication pair.

22. The device as recited in claim 19, further comprising a circuit to impede the induced current based at least in part on the a frequency range of the induced current.

* * * * *